(12) United States Patent
Hori et al.

(10) Patent No.: US 8,531,604 B2
(45) Date of Patent: Sep. 10, 2013

(54) SYNCHRONIZATION SIGNAL GENERATING DEVICE AND DISPLAY APPARATUS

(75) Inventors: Yasuhiro Hori, Tokyo (JP); Koichi Sato, Kanagawa (JP); Shin Arai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 13/040,189

(22) Filed: Mar. 3, 2011

(65) Prior Publication Data
US 2011/0234903 A1 Sep. 29, 2011

(30) Foreign Application Priority Data

Mar. 24, 2010 (JP) .................................. 2010-068063

(51) Int. Cl.
*H03L 7/00* (2006.01)
*H04N 5/06* (2006.01)
*H04N 9/45* (2006.01)
*H04N 9/455* (2006.01)
*H04N 5/45* (2011.01)
*H04N 5/05* (2006.01)

(52) U.S. Cl.
USPC ............................ 348/536; 348/521; 348/524

(58) Field of Classification Search
USPC .................................................. 348/500–551
See application file for complete search history.

(56) References Cited

U.S. PATENT DOCUMENTS

| 5,294,983 | A | | 3/1994 | Ersoz et al. |
| 5,299,007 | A | | 3/1994 | Saeger et al. |
| 5,495,294 | A | * | 2/1996 | Evans et al. .................. 348/536 |
| 6,229,573 | B1 | | 5/2001 | Sato et al. |
| 8,164,689 | B2 | | 4/2012 | Hori et al. |
| 2004/0207756 | A1 | * | 10/2004 | Fujii et al. ..................... 348/521 |
| 2009/0284654 | A1 | * | 11/2009 | Hori et al. ..................... 348/536 |
| 2010/0045865 | A1 | * | 2/2010 | Hori et al. ..................... 348/521 |
| 2011/0007215 | A1 | | 1/2011 | Hori et al. |

FOREIGN PATENT DOCUMENTS

| CN | 1520681 | | 8/2004 |
| JP | 2005-027195 | A | 1/2005 |
| JP | 2009-284030 | A | 12/2009 |
| JP | 2010-050633 | A | 3/2010 |

OTHER PUBLICATIONS

Notification of Reasons for Rejection mailed by Japan Patent Office in the corresponding Japanese patent application No. 2010-068063 on Jul. 17, 2012.
Chinese Office Action for corresponding Chinese application No. 201110071953.3, mailed May 14, 2013, in 3 pages.

* cited by examiner

*Primary Examiner* — Jefferey Harold
*Assistant Examiner* — Michael Teitelbaum
(74) *Attorney, Agent, or Firm* — Knobbe, Martens, Olson & Bear LLP

(57) ABSTRACT

According to embodiments, a synchronization signal generating device includes: a cycle measuring unit configured to measure the vertical synchronization interval of the input video signal; a phase difference detecting unit configured to detect a phase difference between an input vertical synchronization signal based on the input video signal and the display vertical synchronization signal; and a vertical cycle determining unit configured to determine a cycle of the display vertical synchronization signal based on a measurement result of the cycle measuring unit and a detection result of the phase difference detecting unit so that the phase difference is decreased within the range of the compensation interval, and to determine 1/n of the cycle of the display vertical synchronization signal as a cycle of an n-times speed vertical synchronization signal.

18 Claims, 7 Drawing Sheets

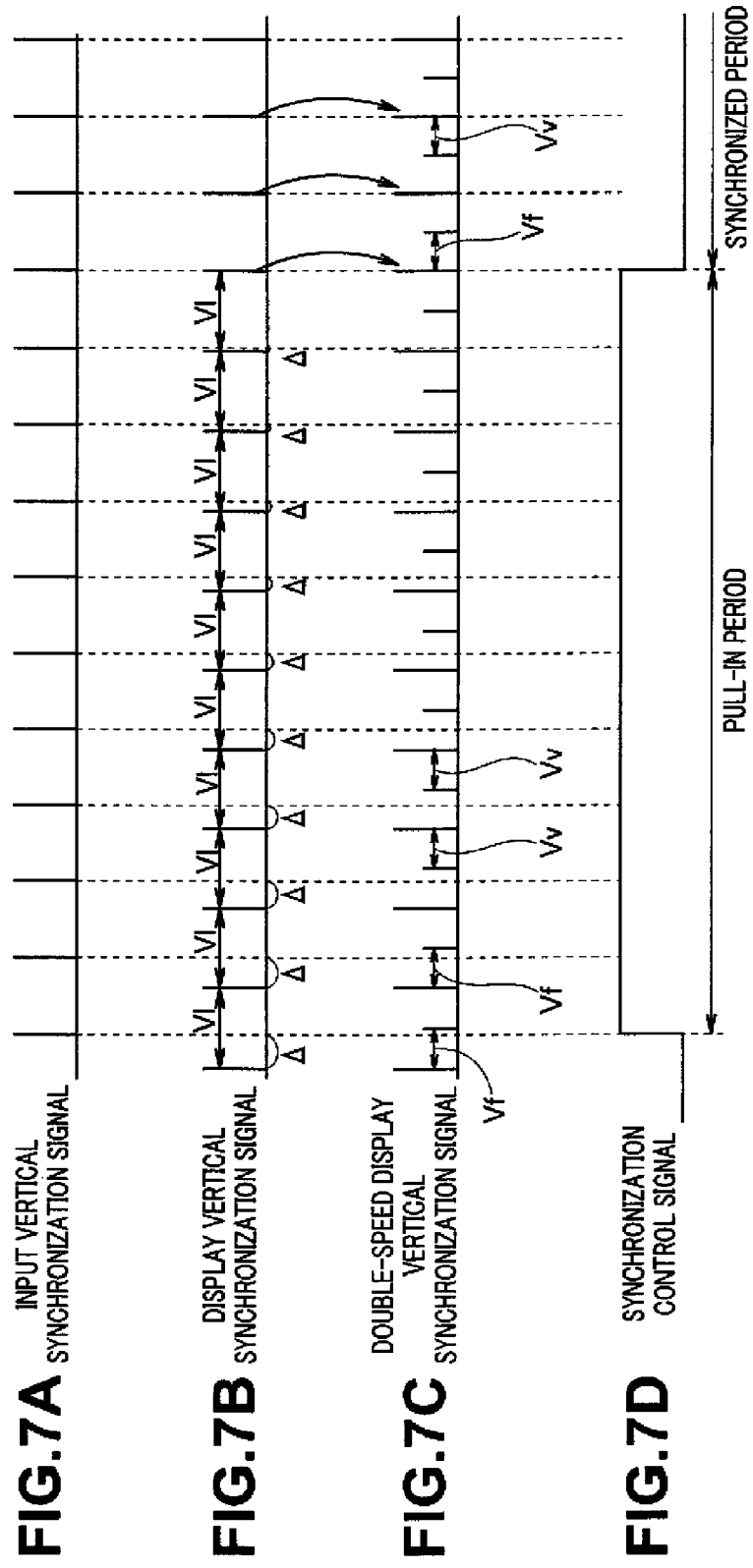

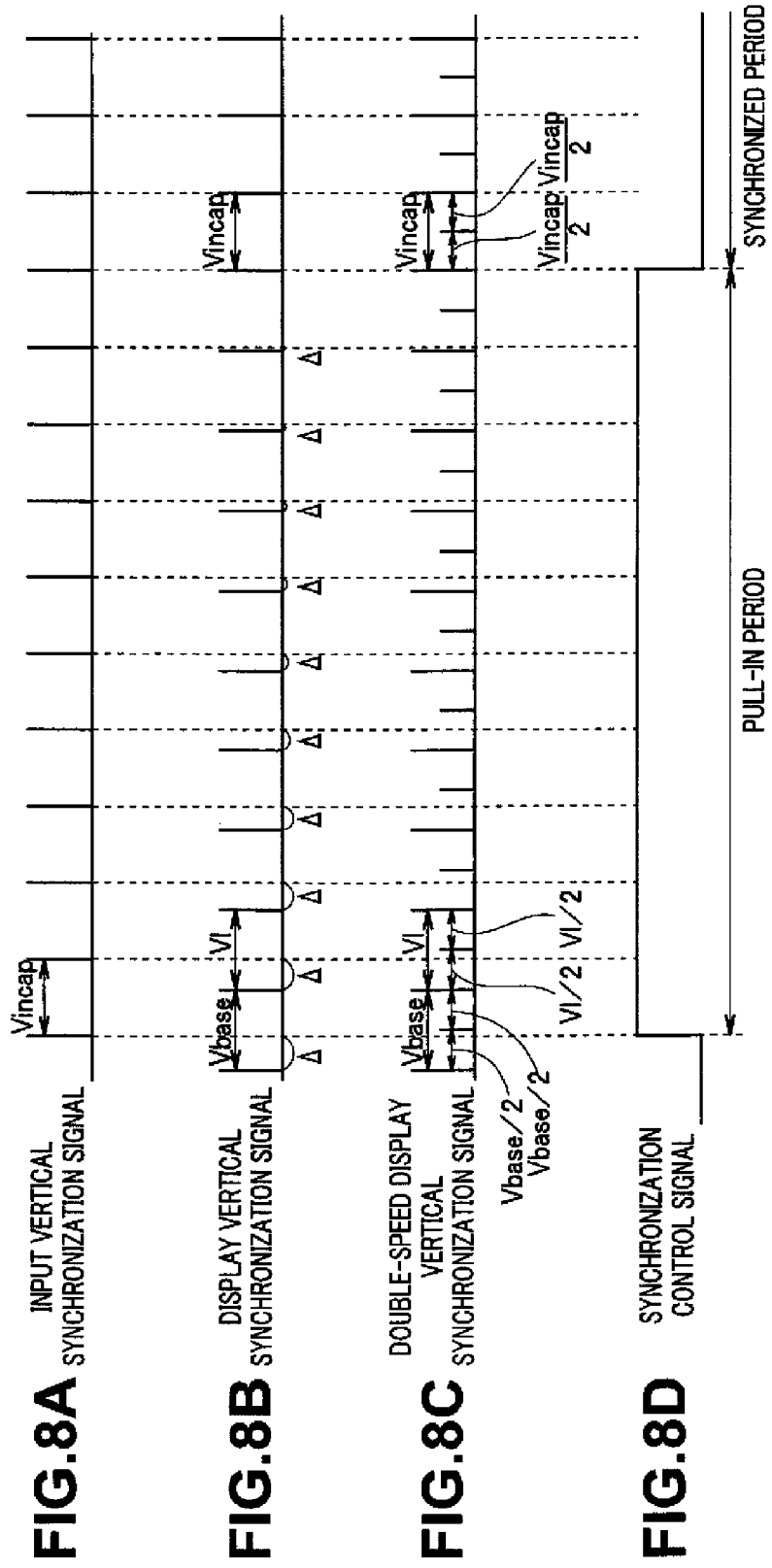

SYNCHRONIZATION SIGNAL GENERATING DEVICE AND DISPLAY APPARATUS

CROSS-REFERENCE TO RELATED APPLICATION

This application is based upon and claims the benefit of priority from Japanese Patent Application No. 2010-68063 filed in Japan on Mar. 24, 2010, the entire contents of which are incorporated herein by reference.

FIELD

Embodiments described herein relate generally to a synchronization signal generating device and a display apparatus.

BACKGROUND

Flat panel displays (hereinafter referred to as FPDs) such as liquid crystal panels and plasma display panels have been widespread as display apparatuses. Horizontal and vertical synchronization signals (hereinafter referred to as display horizontal and vertical synchronization signals) used for display on an FPD have frequencies different from those of horizontal and vertical synchronization signals (hereinafter referred to as input horizontal and vertical synchronization signals) of a video signal (an input video signal) supplied to the FPD.

The frequency of the display vertical synchronization signal of an FPD (hereinafter referred to as a display vertical synchronization frequency), which is the inverse of the cycle of a vertical synchronization signal interval, is a value specific to the display apparatus. The value specific to the display apparatus has an allowance for a vertical synchronization cycle, so that the range between a minimum vertical synchronization interval (Vs) and a maximum synchronization interval (Vl) is set (hereinafter referred to as a compensation interval) to allow the FPD to always provide display based on the input video signal.

Thus, the display vertical synchronization frequency of an FPD varies with the apparatus. Further, the frequency of the input vertical synchronization signal of the input video signal (hereinafter referred to as an input vertical synchronization frequency) may vary with the video source. Both frequencies usually do not match each other. Even the input vertical synchronization frequency of the same channel may sometimes vary.

Therefore, in Japanese Patent Application Laid-Open Publication No. 11-331638 (hereinafter referred to as document 1), the applicant has proposed a synchronization control circuit for synchronizing the display vertical synchronization signal with the input vertical synchronization signal. In this proposal, a process is performed in which, once the starting position of the vertical synchronization of the input video signal falls within the compensation interval allowed for a display apparatus, the display vertical synchronization signal is synchronized with the input vertical synchronization signal thereafter.

However, in the proposal of document 1, the frequency supplied to the display apparatus may vary with each field, and the frequency difference between fields is large especially while the phase difference does not fall within the compensation interval. Such a large frequency difference between fields causes concern for the video quality of the FPD. Further, in an FPD that drives display at a multiple speed, this frequency difference is noticeable and therefore the improvement of the video quality is essential.

BRIEF DESCRIPTION OF THE DRAWINGS

FIGS. 7A-7D are illustrative diagrams showing the synchronization method in document 1; and FIGS. 8A-8D are illustrative diagrams showing a synchronization method in the second embodiment.

DETAILED DESCRIPTION

According to embodiments, a synchronization signal generating device outputs, to a display unit, a display vertical synchronization signal to be used for display based on an input video signal, the display unit being capable of providing display based on the input video signal if a vertical synchronization interval of the input video signal is within a range of a compensation interval between a minimum vertical synchronization interval and a maximum vertical synchronization interval, wherein the synchronization signal generating device includes: a cycle measuring unit configured to measure the vertical synchronization interval of the input video signal; a phase difference detecting unit configured to detect a phase difference between an input vertical synchronization signal based on the input video signal and the display vertical synchronization signal; and a vertical cycle determining unit configured to determine a cycle of the display vertical synchronization signal based on a measurement result of the cycle measuring unit and a detection result of the phase difference detecting unit so that the phase difference is decreased within the range of the compensation interval, and to determine 1/n of the cycle of the display vertical synchronization signal as a cycle of an n-times speed vertical synchronization signal.

Embodiments of the present invention will be described in detail below with reference to the drawings.

(First Embodiment)

Figure 1:
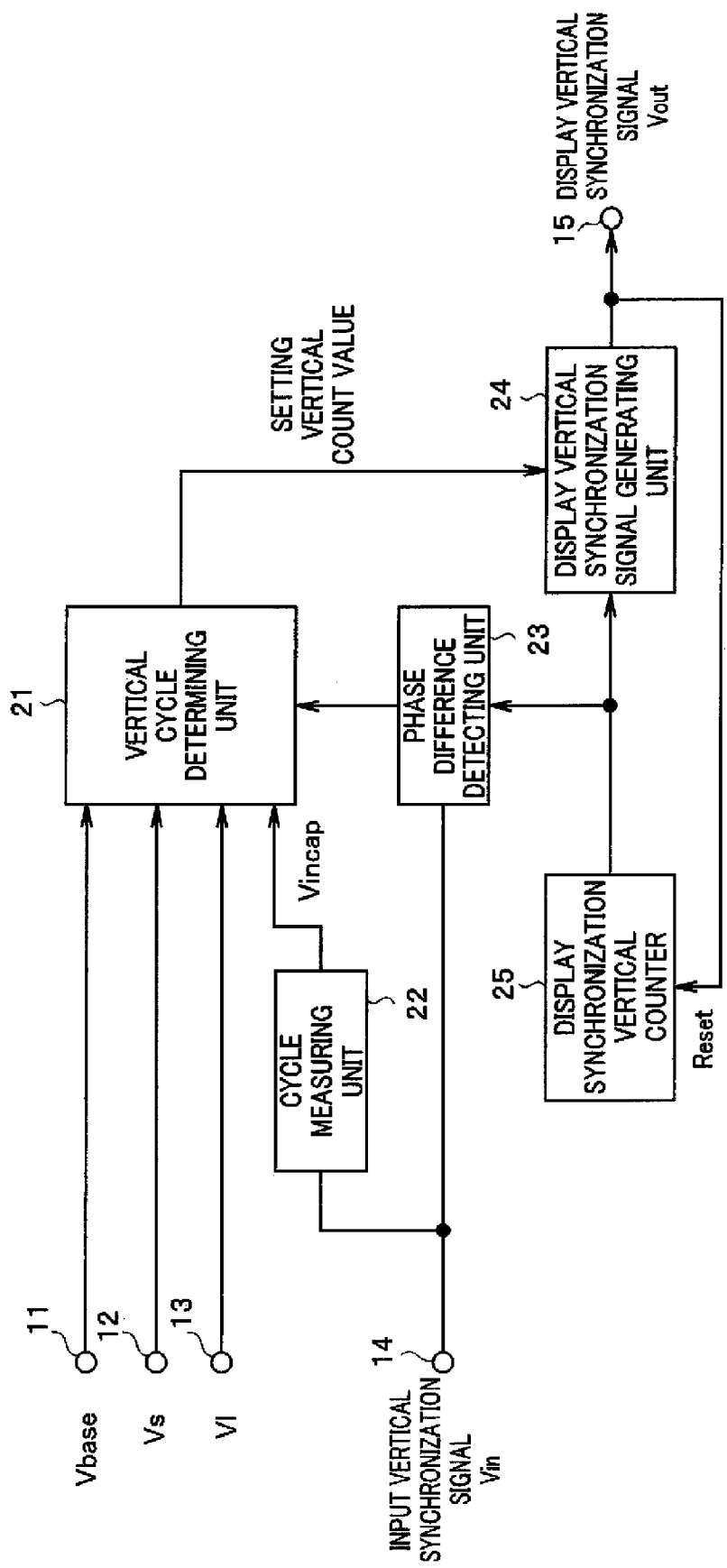
FIG. 1 is a block diagram showing a synchronization signal generating device according to a first embodiment of the present invention.
Figure 2:
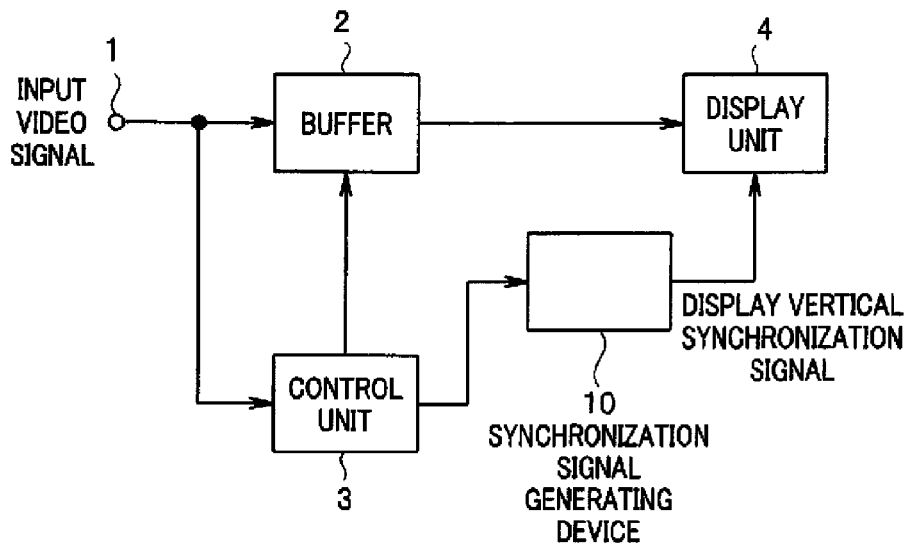
FIG. 2 is a block diagram showing a display apparatus having incorporated therein the synchronization signal generating device according to the first embodiment.

FIG. 1 is a block diagram showing a synchronization signal generating device according to a first embodiment of the present invention. FIG. 2 is a block diagram showing a display apparatus having incorporated therein the synchronization signal generating device according to the first embodiment.

FIG. 1 shows a synchronization signal generating device 10 employed in a display apparatus (for example, an FPD) shown in FIG. 2. The display apparatus provides display by using an apparatus-specific display vertical synchronization signal and display horizontal synchronization signal.

Figure 3:
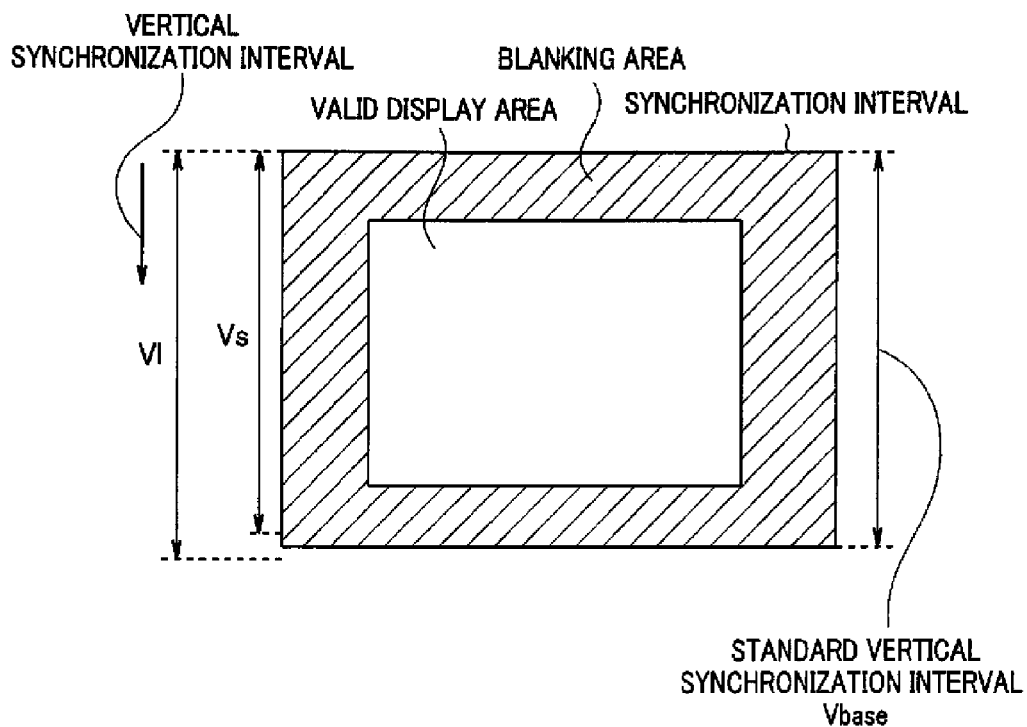
FIG. 3 is an illustrative diagram showing the relationship between a display screen of the display apparatus in FIG. 2 and synchronization intervals.
Figure 4:
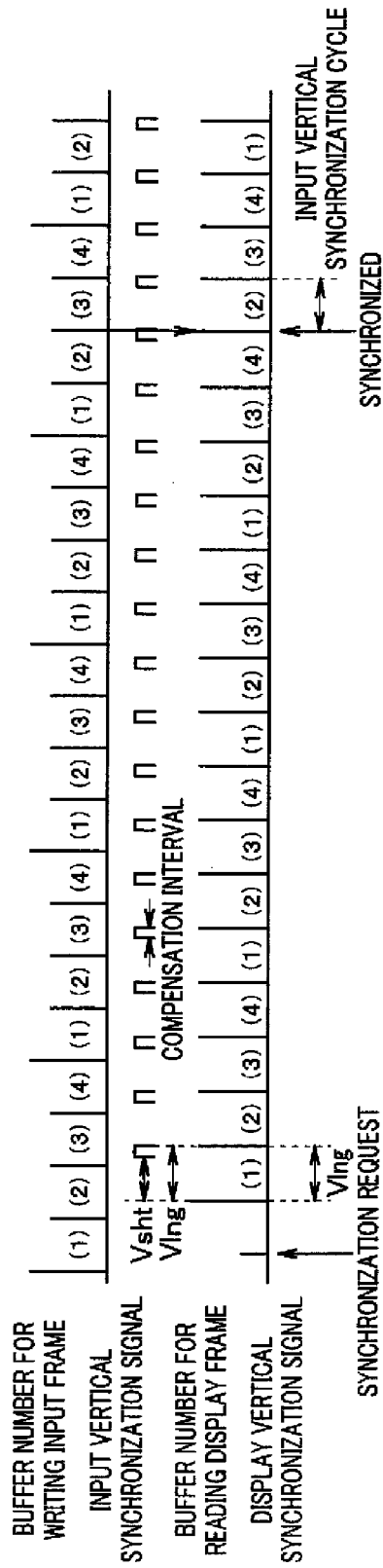
FIG. 4 is an illustrative diagram showing a synchronization method in document 1.
Figure 5:
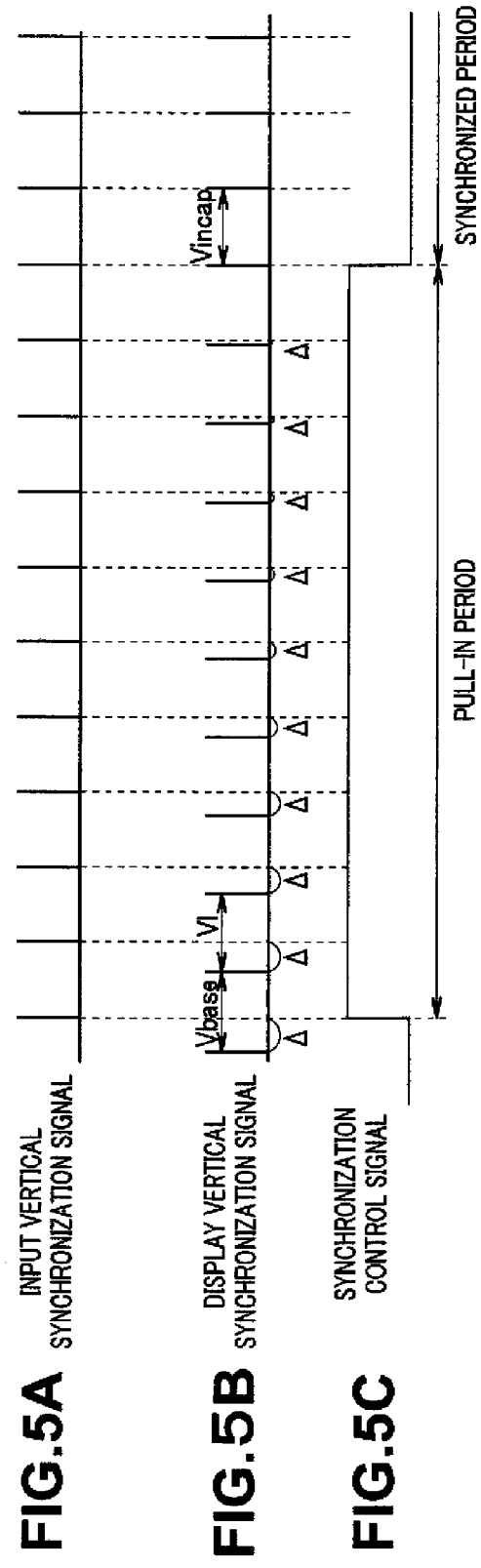
FIGS. 5A-5C are illustrative diagrams showing a synchronization method in the first embodiment.

First, with reference to FIGS. 2 to 5A-5C, a synchronization method in the present embodiment will be described. FIG. 3 is an illustrative diagram showing the relationship between a display screen of the display apparatus in FIG. 2 and synchronization intervals. FIGS. 4 and 5A-5C are illustrative diagrams for describing synchronization, where FIG. 4 shows the synchronization method in document 1, and FIGS. 5A-5C show the synchronization method in the present embodiment.

As shown in FIG. 2, an input video signal input to an input terminal 1 is supplied to a buffer 2 synchronously with an input vertical synchronization signal. The buffer 2, with writing and reading controlled by a control unit 3, holds the input video signal for several frames and outputs the input video signal to a display unit 4. The input video signal is also supplied to the control unit 3. The control unit 3 separates an input horizontal synchronization signal and an input vertical synchronization signal included in the input video signal and supplies the synchronization signals to a synchronization signal generating device 10, and also controls writing to and reading from the buffer 2. The control unit 3 also supplies the value of a standard vertical synchronization signal Vbase, and the values of a minimum vertical synchronization interval Vs and a maximum vertical synchronization interval Vl, to be described later, to the synchronization signal generating device 10.

The synchronization signal generating device 10 generates the display vertical synchronization signal based on the signals supplied from the control unit 3 and supplies the display vertical synchronization signal to the display unit 4. The display unit 4 uses the display vertical synchronization signal to provide display based on the video signal from the buffer 2.

In FIG. 3, a vertical synchronization interval in the display apparatus in FIG. 2 includes an interval corresponding to a valid display area and a blanking area (a shaded portion). The vertical synchronization interval is set to the cycle of the display vertical synchronization signal. Typically, an allowance for a displayable vertical synchronization interval is set for the display apparatus. That is, if the vertical synchronization interval of the input video signal (hereinafter referred to as an input vertical synchronization interval) is within a compensation interval defined by the minimum vertical synchronization interval Vs and the maximum vertical synchronization interval Vl that are set before and after a standard vertical synchronization interval, the display apparatus can provide display based on the input video signal.

The display vertical synchronization signal at the initial state of the display apparatus is the standard vertical synchronization signal (Vbase). The vertical synchronization interval based on the standard vertical synchronization signal will also be denoted as the standard vertical synchronization interval Vbase. Then, as shown in FIG. 3, Vl>Vbase>Vs.

The above-mentioned document 1 employs a synchronization method in FIG. 4. In FIGS. 4 and 5A-5C, the horizontal direction is a time axis, and vertical lines representing boundaries between frames indicate starting points of the vertical synchronization, i.e., vertical synchronization signals. In FIG. 4, the upper layer shows writing each frame of the input video signal to the buffer 2, and the lower layer shows displaying the video signal read out from the buffer 2.

Numbers in brackets indicate numbers of buffer areas in the buffer 2 holding respective frames of the input video signal. The example of FIG. 4 shows that the video signal for four frames is temporarily held in the buffer areas for four frames in the buffer 2. Sequential frames of the input video signal are cyclically written to the buffer areas numbered 1 to 4 in the buffer 2, respectively.

The vertical lines in the upper layer of FIG. 4 indicate the input vertical synchronization signals, whereas the vertical lines in the lower layer indicate the display vertical synchronization signals, which are the vertical synchronization signals of the display apparatus. The example of FIG. 4 shows that, after a synchronization request, the video signal stored in the buffer area numbered 1 is displayed while the input video signal is written to the buffer area numbered 2, that is, display with one-frame delay.

In the apparatus of document 1, in order to prevent images from being compromised by the synchronization, the display apparatus first provides display asynchronously with the input video signal. In this case, the display apparatus provides display by using the standard vertical synchronization signal (Vbase).

Specifically, the apparatus of document 1 monitors the input vertical synchronization signal to detect whether or not the starting point of the input vertical synchronization falls within the compensation interval. If the starting point of the input vertical synchronization is not detected within the compensation interval, the display vertical synchronization signal is generated and used for display. That is, in the apparatus of document 1, it is unknown whether or not the starting point of the input vertical synchronization falls within the compensation interval until the starting point of the input vertical synchronization is detected. Therefore, until the starting point of the input vertical synchronization falls within the compensation interval, the display vertical synchronization signal is generated with the maximum vertical synchronization interval Vl. Thus, to detect whether or not the starting point of the input vertical synchronization falls within the compensation interval, the starting point of the display vertical synchronization needs to be delayed until the limit of the compensation interval. FIG. 4 shows this situation, where the generation timing of the display vertical synchronization signal (the starting point of the display vertical synchronization) gradually delays with respect to the input vertical synchronization signal, so that eventually the starting point of the input vertical synchronization occurs within the compensation interval.

In the example of FIG. 4, generating the display vertical synchronization signal with the minimum vertical synchronization interval Vs would cause the starting point of the input vertical synchronization to fall within the compensation interval in a relatively short time. However, according to the proposal of document 1, the display vertical synchronization signal necessarily needs to be generated with the maximum vertical synchronization interval Vl until the starting point of the input vertical synchronization falls within the compensation interval. Consequently, it takes long to achieve synchronization.

Also according to the proposal of document 1, once the starting point of the input vertical synchronization falls within the compensation interval, a counter for generating the display vertical synchronization signal is reset by the input vertical synchronization signal to thereby perform synchronization. Therefore, immediately after the input vertical synchronization signal has fallen within the compensation interval, the cycle of the generated display vertical synchronization signal changes rather significantly, resulting in deteriorated screen display.

In contrast, the present embodiment allows synchronization in a relatively short time while restraining image deterioration.

The present embodiment employs a synchronization method shown in FIGS. 5A-5C.

Vertical lines in FIG. 5A indicate the input vertical synchronization signals, and vertical lines in FIG. 5B indicate the display vertical synchronization signals of the display apparatus. In the present embodiment, the phase difference between the input vertical synchronization signal and the display vertical synchronization signal (hereinafter also simply referred to as the phase difference) is detected, and the cycle of the display vertical synchronization signal is varied within the compensation interval so that the detected phase difference is decreased.

The display apparatus cannot display input video such that the input vertical synchronization interval exceeds the compensation interval. In other words, a video signal capable of display on the display apparatus is such that the difference between the cycle of the input vertical synchronization signal and the cycle of the display vertical synchronization signal is smaller than the length of the compensation interval. Therefore, the phase difference can be decreased by correcting the cycle of the display vertical synchronization signal within the compensation interval.

For example, for a video signal capable of display on the display apparatus, setting the cycle of the display vertical synchronization signal to the minimum vertical synchronization interval causes a phase change such that the display vertical synchronization signal is advanced with respect to the input vertical synchronization signal. Conversely, setting the cycle of the display vertical synchronization signal to the maximum vertical synchronization interval causes a phase change such that the display vertical synchronization signal is delayed with respect to the input vertical synchronization signal.

Also in the present embodiment, in order to decrease the phase difference in a short time, the direction of correcting the cycle of the display vertical synchronization signal is determined so that the phase of the display vertical synchronization signal is to be aligned with the phase of a temporally closer input vertical synchronization signal.

FIGS. 5A-5C show an example in which the phase of the display vertical synchronization signal is closer to a temporally succeeding one of two temporally preceding and succeeding input vertical synchronization signals. That is, $\Delta$<Vincap/2, where $\Delta$ is the phase difference from the starting point of the display vertical synchronization to the starting point of the input vertical synchronization, and Vincap is the input vertical synchronization interval that varies within a somewhat fixed range. In this case, the phase difference is decreased by setting the cycle of the display vertical synchronization signal to a value larger than the cycle of the input vertical synchronization signal within the range of the compensation interval. For example, the cycle of the display vertical synchronization signal is set to a value between the maximum vertical synchronization interval Vl and Vincap. The example in FIGS. 5A-5C shows a case where the cycle of the display vertical synchronization signal is set to the maximum vertical synchronization interval Vl.

In the present embodiment, the phase difference between the display vertical synchronization signal and the input vertical synchronization signal is sequentially detected, and the cycle of the display vertical synchronization signal is determined so that the phase difference is decreased. Thus, the phase difference between the input vertical synchronization signal and the display vertical synchronization signal can be sufficiently decreased. After the lapse of a certain period, the starting point of the input vertical synchronization occurs within the compensation interval.

As will be described later, in the present embodiment, the phase difference between the input vertical synchronization signal and the display vertical synchronization signal is determined on a line cycle basis. Therefore, the phase difference is also corrected on a line cycle basis.

Further, in the present embodiment, once the starting point of the input vertical synchronization occurs within the compensation interval, the display vertical synchronization signal is generated with a cycle aligning with the input vertical synchronization interval Vincap thereafter. In this manner, the display vertical synchronization signal can be synchronized with the input vertical synchronization signal.

In FIG. 1, an input terminal 11 receives input of the value Vbase of the standard vertical synchronization interval Vbase, an input terminal 12 receives input of the value Vs of the minimum vertical synchronization interval Vs, and an input terminal 13 receives input of the value Vl of the maximum vertical synchronization interval Vl. An input terminal 14 receives an input vertical synchronization signal Vin.

A cycle measuring unit 22 receives input of the input vertical synchronization signal Vin via the input terminal 14. At every occurrence of the starting point of the input vertical synchronization, the cycle measuring unit 22 determines the cycle (the input vertical synchronization interval Vincap) of the input vertical synchronization signal Vin and outputs Vincap to a vertical cycle determining unit 21.

A display synchronization vertical counter 25 receives input of a display vertical synchronization signal Vout as a reset signal Reset from a display vertical synchronization signal generating unit 24 to be described later. The display synchronization vertical counter 25 increments the count for every display horizontal synchronization signal while being reset by the display vertical synchronization signal Vout. That is, the output of the display synchronization vertical counter 25 indicates the interval on a line cycle basis from the starting point of the display vertical synchronization. The count value from the display synchronization vertical counter 25 is output to a phase difference detecting unit 23.

The phase difference detecting unit 23 receives input of the count value from the display synchronization vertical counter 25 and the input vertical synchronization signal Vin from the input terminal 14. The phase difference detecting unit 23 takes and outputs the count value from the display synchronization vertical counter 25 in response to the input vertical synchronization signal Vin. That is, the phase difference detecting unit 23 outputs, as the phase difference $\Delta$, the interval difference on a line cycle basis from the starting point of the display vertical synchronization to the starting point of the input vertical synchronization, i.e., the phase difference with reference to the display vertical synchronization signal between the display vertical synchronization signal and the input vertical synchronization signal. The phase difference $\Delta$ is supplied to the vertical cycle determining unit 21.

At every occurrence of the starting point of the display vertical synchronization (at every generation of the display vertical synchronization signal), the vertical cycle determining unit 21 determines a setting vertical count value corresponding to the cycle from the display vertical synchronization signal to a next display vertical synchronization signal. The vertical cycle determining unit 21 outputs the setting vertical count value to the display vertical synchronization signal generating unit 24.

As described above, the display synchronization vertical counter 25 generates the count value indicating the interval with reference to the last generated display vertical synchronization signal. When the count value from the display synchronization vertical counter 25 reaches the setting vertical count value, the display vertical synchronization signal generating unit 24 generates the display vertical synchronization signal Vout indicating the starting point of the display vertical synchronization. The display vertical synchronization signal Vout output from the output terminal 15 is used for display as the vertical synchronization signal of the display apparatus.

That is, at every generation of the display vertical synchronization signal, the generation timing of the display vertical synchronization signal to be generated next is set according to the setting vertical count value. The vertical cycle determining unit 21 determines the setting vertical count value so that the phase difference is decreased. The vertical cycle determining unit 21 also determines the setting vertical count value so that the phase difference is decreased in a short time.

For example, if the input vertical synchronization interval Vincap and the phase difference Δ has a relationship such that the phase difference Δ<Vincap/2, the vertical cycle determining unit 21 decreases the phase difference by setting the cycle of the display vertical synchronization signal (the setting vertical count value) to be larger than the cycle of the input vertical synchronization signal within the range of the compensation interval. For example, the cycle of the display vertical synchronization signal is set to a value between the maximum vertical synchronization interval Vl and Vincap.

Conversely, if the phase difference Δ>Vincap/2, the vertical cycle determining unit 21 brings the phase difference closer to Vincap by setting the cycle of the display vertical synchronization signal to be smaller than the cycle of the input vertical synchronization signal within the range of the compensation interval. This is equivalent to decreasing the phase difference Δ where the phase difference Δ is determined as the phase difference with reference to the input vertical synchronization signal between the display vertical synchronization signal and the input vertical synchronization signal. That is, in this case, the vertical cycle determining unit 21 sets the cycle of the display vertical synchronization signal (the setting vertical count value) to a value between the minimum vertical synchronization interval Vs and Vincap, for example.

In this manner, even if the starting point of the input vertical synchronization does not occur within the compensation interval immediately after a synchronization request, the phase difference between the display vertical synchronization signal and the input vertical synchronization signal is gradually decreased. After the lapse of a certain time, the starting point of the input vertical synchronization occurs within the compensation interval. Thereafter, the vertical cycle determining unit 21 outputs the value of the input vertical synchronization interval Vincap as the setting vertical count value.

Next, the operation in the present embodiment configured as above will be described.

It is assumed here that a synchronization request is issued in response to channel switching or the like. The input vertical synchronization signal Vin is input to the synchronization signal generating device 10 via the input terminal 14. The input vertical synchronization signal Vin is provided to the phase difference detecting unit 23. The count value indicating the line cycle with reference to the display vertical synchronization signal is also provided from the display synchronization vertical counter 25 to the phase difference detecting unit 23. The phase difference detecting unit 23 determines the phase difference Δ with reference to the display vertical synchronization signal Vout between the display vertical synchronization signal and the input vertical synchronization signal, and outputs the phase difference Δ to the vertical cycle determining unit 21.

The input vertical synchronization signal Vin is also provided to the cycle measuring unit 22. The cycle measuring unit 22 detects the cycle of the input vertical synchronization signal and outputs the input vertical synchronization interval Vincap to the vertical cycle determining unit 21.

The vertical cycle determining unit 21 also receives the value Vbase of the standard vertical synchronization interval, the value Vs of the minimum vertical synchronization interval, and the value Vl of the maximum vertical synchronization interval. For the vertical cycle determining unit 21, a pull-in period is specified, for example by the control unit 3, with a synchronization control signal generated in response to the synchronization request. It is assumed here that, immediately before the pull-in period, the display vertical synchronization signal Vout is generated with the cycle of the standard vertical synchronization interval Vbase as shown in FIG. 5B. Once the pull-in period is specified, the vertical cycle determining unit 21 generates the setting vertical count value so that the phase difference Δ is decreased or so that the phase difference Δ approaches to Vincap.

In the example of FIGS. 5A-5C, Δ<Vincap/2. Therefore, the vertical cycle determining unit 21 generates the setting vertical count value of the line cycle corresponding to a cycle between Vincap and Vl, for example Vl, so that the phase difference Δ is decreased. The setting vertical count value is provided to the display vertical synchronization signal generating unit 24. The display vertical synchronization signal generating unit 24 generates the display vertical synchronization signal after the lapse of an interval corresponding to the setting vertical count value from the last generated display vertical synchronization signal. The above process is repeated at every generation of the display vertical synchronization signal.

In this manner, as shown in FIGS. 5A and 5B, the phase of the display vertical synchronization signal is gradually delayed with respect to the input vertical synchronization signal, so that the phase difference Δ is gradually decreased. Once the vertical cycle determining unit 21 detects the occurrence of the input vertical synchronization signal within the compensation interval based on the phase difference Δ, the vertical cycle determining unit 21 sets the setting vertical count value to a value corresponding to the input vertical synchronization interval Vincap thereafter.

Thus, as illustrated in a synchronized period in FIGS. 5B and 5C, the display vertical synchronization signal is generated at every input vertical synchronization interval Vincap and synchronizes with the input vertical synchronization signal.

During the pull-in period, the cycle of the display vertical synchronization signal is varied in the direction in which the phase difference is decreased sooner. This allows a shorter pull-in period. The display vertical synchronization interval may also be varied mildly by setting the setting count value as appropriate, preventing the vertical interval from rapidly changing to cause image deterioration.

Thus, in the present embodiment, the phase difference between the input vertical synchronization signal and the display vertical synchronization signal is detected, and the cycle of the display vertical synchronization signal is varied within the compensation interval so that the phase difference is decreased sooner. This allows synchronization in a short time while restraining image deterioration even if an asynchronous video signal with respect to the display synchronization is input.

In the above embodiment, after the synchronization is achieved, the vertical cycle determining unit sets the vertical count value to a value corresponding to the input vertical synchronization interval. However, even after the synchronization is achieved, control may be performed to decrease the phase difference based on the detection result of the phase difference detecting unit 23. In this case, although the phase difference may be temporarily increased in the opposite direction, the display vertical synchronization signal can be almost synchronized with the input vertical synchronization signal.

(Second Embodiment)

Figure 6:
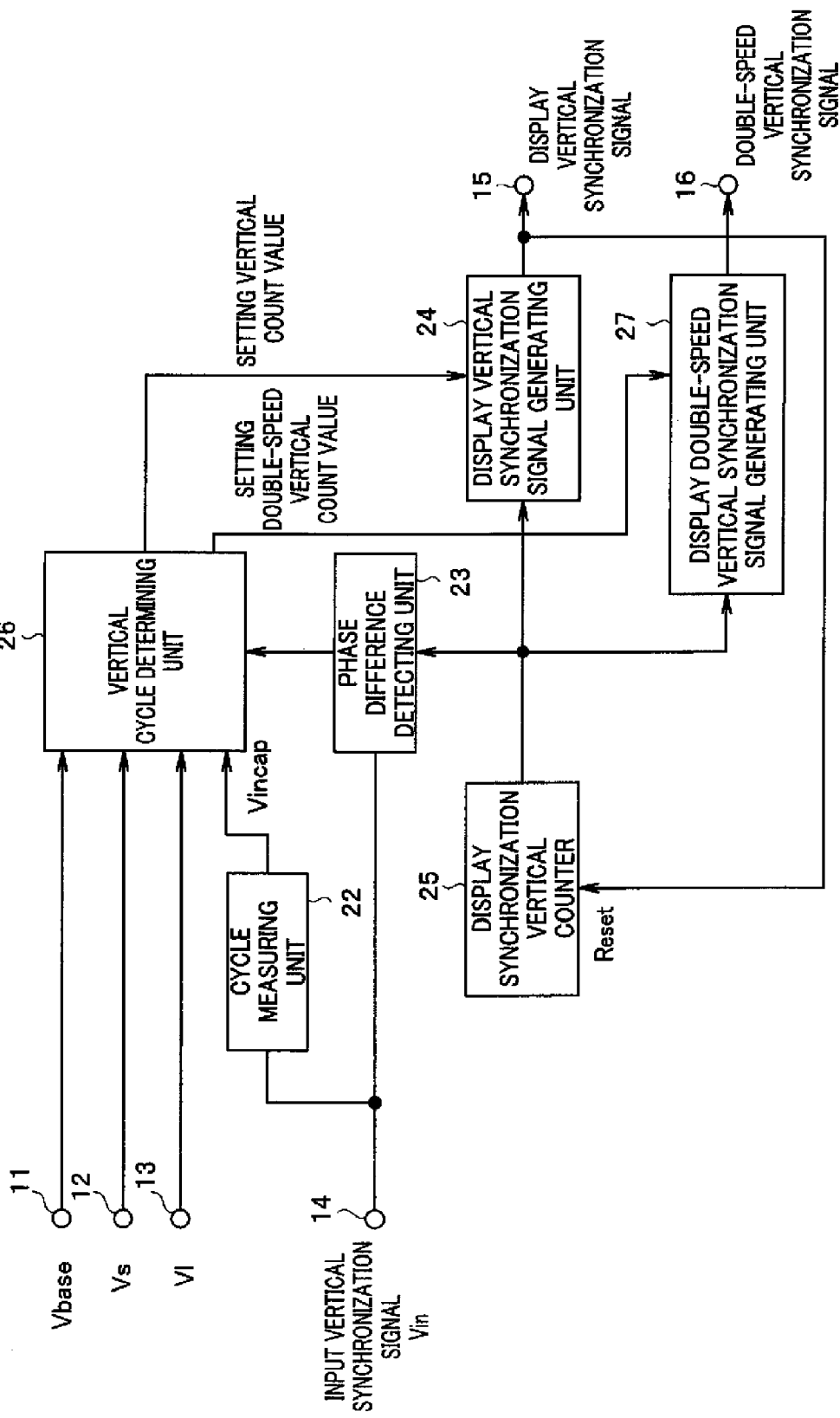
FIG. 6 is a block diagram showing a second embodiment of the present invention.

FIG. 6 is a block diagram showing a second embodiment of the present invention. In FIG. 6, the same components as in FIG. 1 are given the same symbols and will not be described again.

First, with reference to FIGS. 7A-7D and 8A-8D, a synchronization method in the present embodiment will be described. FIGS. 7A-7D show the synchronization method in document 1, and FIGS. 8A-8D show the synchronization method in the present embodiment. In FIGS. 7A-7D and 8A-8D, the horizontal direction is a time axis, and vertical lines representing boundaries between fields indicate starting points of the vertical synchronization, i.e., vertical synchronization signals. In FIGS. 7C and 8C, long vertical lines indicate display vertical synchronization signals, and short vertical lines indicate double-speed vertical synchronization signals.

In recent years, double-speed driving may be employed in which the input video signal with a field frequency of 60 Hz is displayed at a double speed by using the display vertical synchronization signal of 120 Hz. The present embodiment is applied to such double-speed driving. In such double-speed driving, it is necessary to generate a double-speed vertical synchronization signal that provides the starting point of the vertical synchronization at an intermediate phase of half the cycle of the display vertical synchronization signal. That is, if the input video signal has a field frequency of 60 Hz, the double-speed driving requires performing scanning by using the double-speed vertical synchronization signal with a field frequency of 120 Hz.

FIGS. 7A-7D show a technique of generating the double-speed vertical synchronization signal by employing the proposal of document 1. According to the proposal of document 1, as described above, the generation timing of the display vertical synchronization signal (FIG. 7B) is unknown until the generation timing of the input vertical synchronization signal (FIG. 7A) in either of the pull-in period and the synchronized period shown in FIG. 7D. Therefore, as shown in FIG. 7C, to generate the intermediate phase for the proposal of document 1, the double-speed vertical synchronization signal must be generated at a fixed interval Vf after the lapse of a preset number of counts from the generated display vertical synchronization signal.

Thus, the interval from the timing corresponding to the display vertical synchronization signal to the intermediate phase (hereinafter referred to as a first double-speed vertical interval) is fixed. On the other hand, the interval from the timing of the intermediate phase to the timing corresponding to a next vertical synchronization signal (hereinafter referred to as a second double-speed vertical interval) is a variable interval depending on the generation of the input vertical synchronization signal. That is, the first double-speed vertical interval Vf and the second double-speed vertical interval Vv may differ in length. Depending on the input vertical frequency, the difference between the first double-speed vertical interval Vf and the second double-speed vertical interval Vv may be rather significant.

When a liquid crystal panel is used as the display apparatus, a backlight is generally used. The backlight is pulse-driven synchronously with the display vertical synchronization signal. However, the first double-speed vertical interval and the second double-speed vertical interval before and after the intermediate phase differ in display interval. Therefore, the backlight is driven with different numbers of pulses in the first and second double-speed vertical intervals, resulting in the difference in brightness between the first and second double-speed vertical intervals. This appears as flicker on the screen.

In contrast, in the present embodiment, as in the first embodiment, the phase difference between the input vertical synchronization signal (FIG. 8A) and the display vertical synchronization signal (FIG. 8B) is detected, and the display vertical synchronization signal is generated so that the phase difference is decreased. That is, also in the present embodiment, based on the phase difference, the generation timing of the display vertical synchronization signal to be generated next is determined according to the setting vertical count value (FIG. 8B).

Specifically, also in the present embodiment, the generation timing of the display vertical synchronization signal to be generated next is determined before generating the display vertical synchronization signal. Therefore, the generation timing of the double-speed vertical synchronization signal at the intermediate phase is also controllable based on the determined display vertical synchronization signal. In the present embodiment, the double-speed vertical synchronization signal at the intermediate phase is generated at half the interval to the display vertical synchronization signal to be generated next (FIG. 8C). Thus, the first double-speed vertical interval and the second double-speed vertical interval can be equal in length.

As shown in FIG. 6, the present embodiment differs from the first embodiment in that a vertical cycle determining unit 26 is employed instead of the vertical cycle determining unit 21 and that a display double-speed vertical synchronization signal generating unit 27 is added. The vertical cycle determining unit 26 determines the setting vertical count value and outputs the setting vertical count value to the display vertical synchronization signal generating unit 24, in the same manner as the vertical cycle determining unit 21 in FIG. 1. Further, the vertical cycle determining unit 26 determines a setting double-speed vertical count value, which is half the setting vertical count value, and outputs the setting double-speed vertical count value to the display double-speed vertical synchronization signal generating unit 27.

The display double-speed vertical synchronization signal generating unit 27 receives input of the count value of the vertical cycle on a line cycle basis with reference to the last generated vertical synchronization signal from the display synchronization vertical counter 25. When the count value reaches the setting double-speed vertical count value, the display double-speed vertical synchronization signal generating unit 27 generates the double-speed display vertical synchronization signal indicating the starting point of the double-speed vertical synchronization. The display double-speed vertical synchronization signal generating unit 27 outputs the double-speed vertical synchronization signal via an output terminal 16. The display vertical synchronization signal and the double-speed vertical synchronization signal output from the output terminals 15 and 16 are used for display as the vertical synchronization signals of the display apparatus.

Next, the operation in the present embodiment configured as above will be described.

Also in the present embodiment, once a synchronization request is issued, the pull-in period is set by, for example, the control unit 3. The phase difference detecting unit 23 determines the phase difference between the display vertical synchronization signal and the input vertical synchronization signal and outputs the phase difference to the vertical cycle determining unit 26. The cycle measuring unit 22 detects the cycle of the input vertical synchronization signal and outputs the input vertical synchronization interval Vincap to the vertical cycle determining unit 26.

The vertical cycle determining unit 26 generates the setting vertical count value so that the phase difference is decreased during the pull-in period. Further, in the present embodiment, the vertical cycle determining unit 26 generates the setting double-speed vertical count value of half the setting vertical count value.

In the example of FIGS. 8A-8D, the phase difference with reference to the display vertical synchronization signal is smaller than Vincap/2. Therefore, the vertical cycle determining unit 26 generates the setting vertical count value of the line cycle corresponding to a cycle between Vincap and Vl, for example Vl. The vertical cycle determining unit 26 also generates the setting double-speed vertical count value of the line cycle corresponding to half the setting vertical count value, i.e., Vl/2. The setting vertical count value is provided to the display vertical synchronization signal generating unit 24, and the setting double-speed vertical count value is provided to the display double-speed vertical synchronization signal generating unit 27.

The display vertical synchronization signal generating unit 24 generates the display vertical synchronization signal after the lapse of an interval corresponding to the setting vertical count value from the last generated display vertical synchronization signal. Similarly, the display double-speed vertical synchronization signal generating unit 27 generates the double-speed display vertical synchronization signal after the lapse of an interval corresponding to the setting double-speed vertical count value from the last generated display vertical synchronization signal. The above process is repeated at every generation of the display vertical synchronization signal.

In this manner, as shown in FIG. 8B, the phase of the display vertical synchronization signal is gradually delayed with respect to the input vertical synchronization signal, so that the phase difference is gradually decreased. Once the vertical cycle determining unit 26 detects the occurrence of the input vertical synchronization signal within the compensation interval based on the phase difference, the vertical cycle determining unit 26 sets the setting vertical count value to a value corresponding to the input vertical synchronization interval Vincap thereafter. The vertical cycle determining unit 26 also sets the setting double-speed vertical count value to a value corresponding to half the input vertical synchronization interval Vincap.

Thus, as illustrated in the synchronized period in FIGS. 8B-8D, the display vertical synchronization signal is generated at every input vertical synchronization interval Vincap and synchronizes with the input vertical synchronization signal. Also, the double-speed vertical synchronization signal is generated in half the cycle of the input vertical synchronization interval Vincap.

Thus, the present embodiment can achieve the same advantages as the first embodiment. Also, in the double-speed driving, the present embodiment can ensure that the double-speed vertical synchronization signal is generated at the intermediate phase of half the display vertical synchronization interval. This allows preventing the difference in brightness between the first double-speed vertical interval and the second double-speed vertical interval before and after the intermediate phase, thereby reducing the occurrence of flicker.

The above embodiment has been described for the double-speed driving as an example of multiple-speed driving. However, it is apparent that the above embodiment may be similarly applied to triple-speed or faster multiple-speed driving. In such cases, the vertical cycle determining unit 26 may output an n-times speed vertical count value, which is 1/n of the setting vertical count value, where n denotes a multiple of the speed (n is an integer not smaller than 2). The present invention is not limited to the above-described embodiments and susceptible to various modifications and alterations without departing from the spirit thereof.

While certain embodiments have been described, these embodiments have been presented by way of example only, and are not intended to limit the scope of the inventions. Indeed, the novel system described herein may be embodied in a variety of other form; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A synchronization signal generating device configured to receive an input video signal and to output a display vertical synchronization signal, the synchronization signal generating device comprising:
    a cycle measuring unit configured to measure the vertical synchronization interval of the input video signal;
    a phase difference detecting unit configured to detect a phase difference between an input vertical synchronization signal associated with the input video signal and the display vertical synchronization signal;
    a vertical cycle determining unit configured to control a cycle of the display vertical synchronization signal so that the phase difference is decreased within a range of a compensation interval by advancing or delaying a phase of the display vertical synchronization signal, the compensation interval comprising a range between a minimum vertical synchronization interval and a maximum vertical synchronization interval, the vertical cycle determining unit further configured to determine a timing of the display vertical synchronization signal to be generated next based on a measurement result of the cycle measuring unit and a detection result of the phase difference detecting unit and to set 1/n of the cycle of the display vertical synchronization signal obtained based on the timing of the display vertical synchronization signal to be generated next as a cycle of an n-times-speed driving vertical synchronization signal; and
    a display vertical synchronization generating unit configured to generate the display vertical synchronization signal of the cycle based on the vertical cycle determining unit.

2. The synchronization signal generating device according to claim 1, wherein
    the vertical cycle determining unit determines whether to increase or decrease the cycle of the display vertical synchronization signal based on whether the phase difference between the input vertical synchronization signal and the display vertical synchronization signal is larger than half the cycle of the display vertical synchronization signal.

3. The synchronization signal generating device according to claim 1, wherein
    the vertical cycle determining unit is configured to set the cycle of the display vertical synchronization signal to an inverse of a frequency between the vertical synchronization interval of the input video signal and the minimum vertical synchronization interval or an inverse of a frequency between the vertical synchronization interval of the input video signal and the maximum vertical synchronization interval so that the phase difference is decreased within the range of the compensation interval.

4. The synchronization signal generating device according to claim 1, wherein
the vertical cycle determining unit defines a generation timing of the display vertical synchronization signal to be generated next by generating a count value corresponding to the determined cycle with reference to the display vertical synchronization signal.

5. The synchronization signal generating device according to claim 4, wherein
the vertical cycle determining unit generates the count value so that the phase difference is decreased.

6. The synchronization signal generating device according to claim 1, wherein
the phase difference detecting unit sequentially determines the phase difference between the input vertical synchronization signal and the display vertical synchronization signal.

7. The synchronization signal generating device according to claim 1, wherein
the phase difference detecting unit determines the phase difference between the input vertical synchronization signal and the display vertical synchronization signal on a line cycle basis.

8. The synchronization signal generating device according to claim 1, wherein
the cycle measuring unit receives input of the input vertical synchronization signal and determines the vertical synchronization interval of the input video signal by counting a horizontal cycle at every occurrence of a starting point of the input vertical synchronization signal.

9. The synchronization signal generating device according to claim 1, wherein if the input vertical synchronization signal is within the range of the compensation interval, the vertical cycle determining unit sets the cycle of the display vertical synchronization signal based on the measurement result of the cycle measuring unit, the phase difference of the input vertical synchronization signal and the display vertical synchronization signal due to a misalignment between the cycle of the input vertical synchronization signal and the cycle of the display vertical synchronization signal.

10. The synchronization signal generating device according to claim 9, wherein
the vertical cycle determining unit determines whether to increase or decrease the cycle of the display vertical synchronization signal to be generated next based on whether or not the phase difference between the input vertical synchronization signal and the display vertical synchronization signal is larger than half the cycle of the display vertical synchronization signal.

11. The synchronization signal generating device according to claim 9, wherein
the vertical cycle determining unit sets the cycle of the display vertical synchronization signal to an inverse of a frequency between the vertical synchronization interval of the input video signal and the minimum vertical synchronization interval or an inverse of a frequency between the vertical synchronization interval of the input video signal and the maximum vertical synchronization interval so that the phase difference is decreased within the range of the compensation interval.

12. The synchronization signal generating device according to claim 9, wherein
the vertical cycle determining unit defines a generation timing of the display vertical synchronization signal by generating a count value corresponding to the determined cycle with reference to the display vertical synchronization signal.

13. The synchronization signal generating device according to claim 12, wherein
the vertical cycle determining unit generates the count value so that the phase difference is decreased in a short time.

14. The synchronization signal generating device according to claim 9, wherein
the phase difference detecting unit sequentially determines the phase difference between the input vertical synchronization signal and the display vertical synchronization signal.

15. The synchronization signal generating device according to claim 9, wherein
the phase difference detecting unit determines the phase difference between the input vertical synchronization signal and the display vertical synchronization signal on a line cycle basis.

16. The synchronization signal generating device according to claim 9, wherein
the cycle measuring unit receives input of the input vertical synchronization signal and determines the vertical synchronization interval of the input video signal by counting a horizontal cycle at every occurrence of a starting point of the input vertical synchronization signal.

17. A display apparatus comprising:
a synchronization signal generating device configured to output a display vertical synchronization signal, to a display unit;
a control unit configured to control the synchronization signal generating device and to read out a video signal stored in a buffer to provide the video signal as the input video signal to the display unit; and
a display vertical synchronization signal to be used for display of an input video signal, the display unit being capable of providing display based on the input video signal if a vertical synchronization interval of the input video signal is within a range of a compensation interval, the compensation interval comprising the range between a minimum vertical synchronization interval and a maximum vertical synchronization interval, the synchronization signal generating device comprising:
a cycle measuring unit configured to measure the vertical synchronization interval of the input video signal;
a phase difference detecting unit configured to detect a phase difference between an input vertical synchronization signal based on the input video signal and the display vertical synchronization signal; and
a vertical cycle determining unit configured to control a cycle of the display vertical synchronization signal so that the phase difference is decreased within the range of the compensation by advancing or delaying a phased of the display vertical synchronization signal, the vertical cycle determining unit further configured to determine a timing of the display vertical synchronization signal to be generated next based on a measurement result of the cycle measuring unit and a detection result of the phase difference detecting unit and to set 1/n of the cycle of the display vertical synchronization signal obtained based on the timing of the display vertical synchronization signal to be generated next as a cycle of an n-times-speed driving vertical synchronization signal.

18. The display apparatus according to claim 17, wherein the vertical cycle determining unit sets the cycle of the display vertical synchronization signal based on a measurement result of the cycle measuring unit when it is detected, based on the phase difference, that the input vertical synchronization signal is within the range of the compensation interval as a result of change of the phase of the display vertical synchronization signal with respect to the input vertical synchronization signal due to a misalignment between the cycle of the input vertical synchronization signal and the display vertical synchronization signal.

\* \* \* \* \*